United States Patent [19]
Spatafora

[11] Patent Number: 5,906,265
[45] Date of Patent: May 25, 1999

[54] METHOD AND DEVICE FOR THE ORDERLY SUPPLY OF RANDOMLY RECEIVED PRODUCTS

[75] Inventor: Mario Spatafora, Bologna, Italy

[73] Assignee: Azionaria Costruzioni Macchine Automatiche A.C.M.A. S.P.A., Bologna, Italy

[21] Appl. No.: 08/852,560

[22] Filed: May 7, 1997

[30] Foreign Application Priority Data

May 8, 1996 [IT] Italy ................................ BO96A 0255

[51] Int. Cl.⁶ .................................................. B65G 47/26
[52] U.S. Cl. ..................................... 198/460.2; 198/461.1
[58] Field of Search ............................ 198/460.2, 460.3, 198/461.1

[56] References Cited

U.S. PATENT DOCUMENTS

| | | | |
|---|---|---|---|
| 3,370,693 | 2/1968 | Marsden | 198/460.2 |
| 4,881,635 | 11/1989 | Raschke | 198/460.2 |
| 5,191,965 | 3/1993 | Scheid | 198/460.2 |
| 5,322,154 | 6/1994 | Lenherr | 198/460.2 |
| 5,547,004 | 8/1996 | Fransen | 198/460.2 |

FOREIGN PATENT DOCUMENTS

| | | |
|---|---|---|
| 0317198 | 5/1989 | European Pat. Off. . |
| 0433231 | 6/1991 | European Pat. Off. . |
| 0623535 | 11/1994 | European Pat. Off. . |
| 2069959 | 9/1981 | United Kingdom . |

*Primary Examiner*—Joseph E. Valenza
*Attorney, Agent, or Firm*—Ladas & Parry

[57] ABSTRACT

A method and device for supplying an orderly succession of randomly received products to a user machine, whereby a first and second conveyor, traveling at respective speeds, define a path having two portions of variable lengths complementary to each other, and which are connected at a movable transfer station by a pocket type transfer device for transferring the products from the first conveyor into respective pockets equally spaced with a given spacing along the second conveyor; the random distribution of the products on the first conveyor being adapted to the equal spacing of the pockets on the second conveyor by adjusting the speed at which the products arrive at the transfer station, and/or the position of the transfer station.

16 Claims, 4 Drawing Sheets

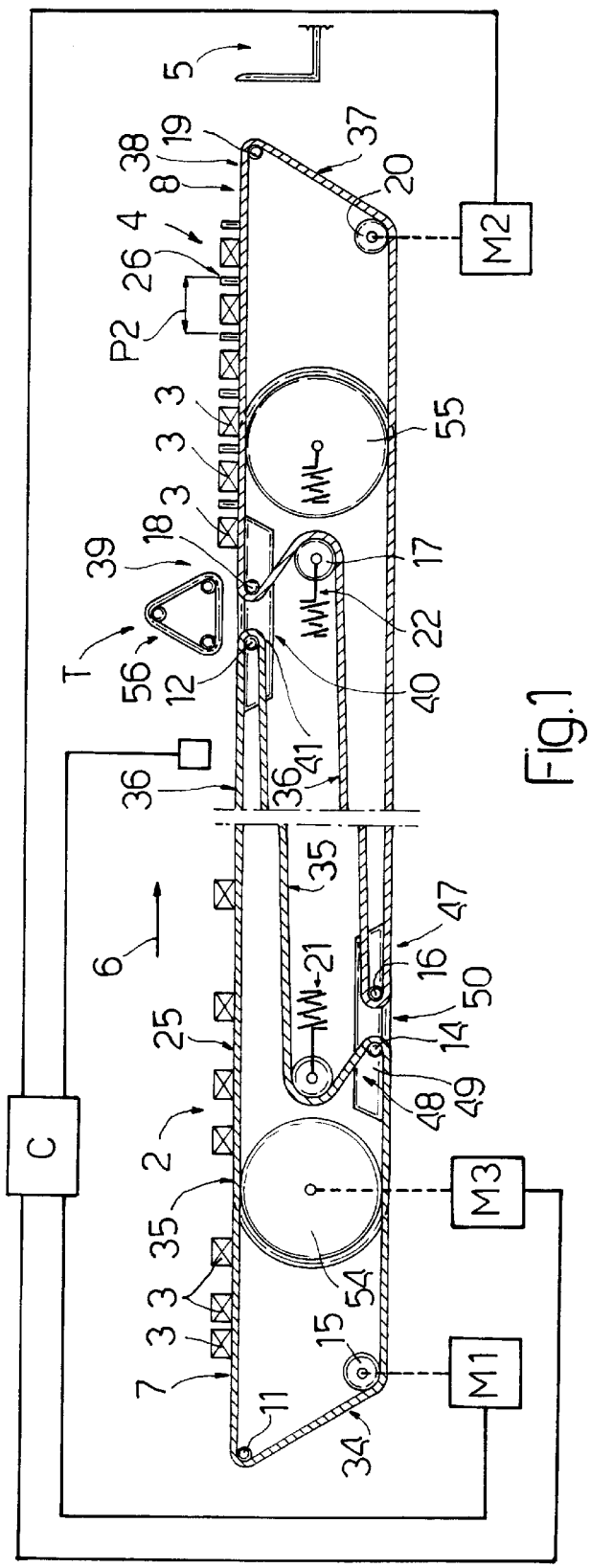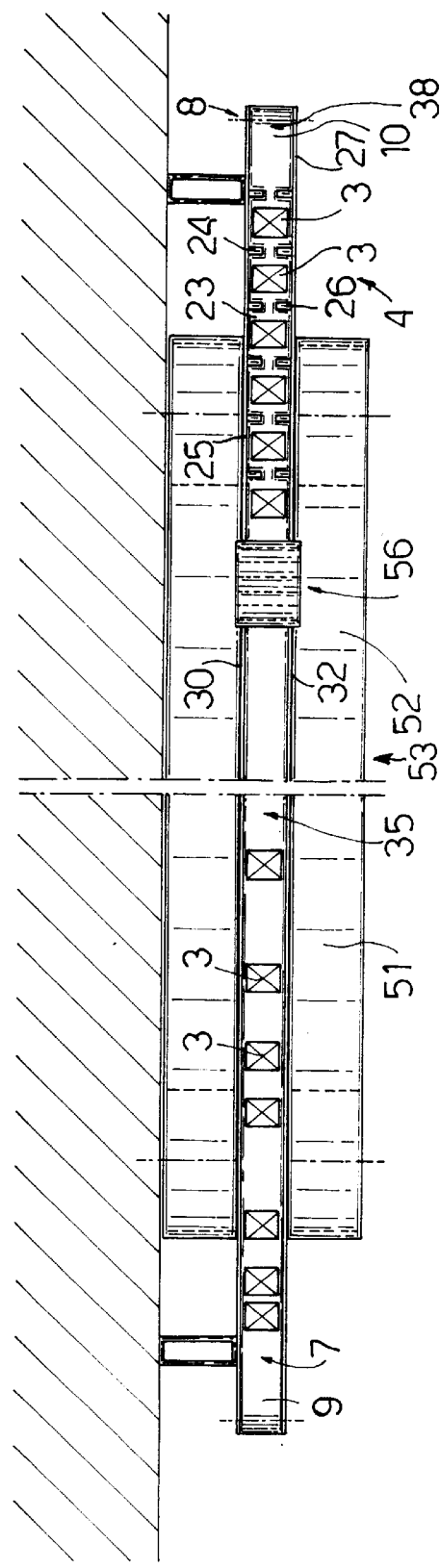

5,906,265

METHOD AND DEVICE FOR THE ORDERLY SUPPLY OF RANDOMLY RECEIVED PRODUCTS

BACKGROUND OF THE INVENTION

The present invention relates to a method for the orderly supply of randomly received products.

The present invention is particularly advantageous for supplying food products in general, and confectionary in particular, to a wrapping machine, to which application the following description refers purely by way of example.

Food product manufacturing and packing systems are known to employ wrapping machines, each of which receives the products for wrapping in an orderly, i.e. equally spaced, succession; and dispensing devices, each of which supplies the products either in randomly aligned fashion, or in an orderly arrangement, e.g. in batches, other than that required by the wrapping machine connected to the dispensing device. As such, the arrangement of the products must be adjusted as they are transferred from the dispensing device to the follow-up wrapping machine.

The same also applies in the case of a dispensing device designed to supply the products arranged as required by the wrapping machine, if the orderly sequence with which the products are supplied is interrupted by temporary stoppage of the dispensing device or by rejection of one or a group of products in the sequence.

Italian Patent No. 797,350 and European Patent No. 433,231 relate to methods for the orderly supply of randomly received products to a follow-up machine, and which comprise the steps of conveying a succession of products by means of a first conveying device traveling in a given direction at a first speed, and comprising a first conveying portion of variable length extending between a loading station and a movable transfer station; conveying an orderly succession of products by means of a second conveying device traveling in said given direction at a second speed, and comprising a second conveying portion of variable length complementary to the length of the first conveying portion, the second conveying portion extending between the movable transfer station and an unloading station; and varying the lengths of the two conveying portions by means of an adjusting device, and as a function of the succession of products on the first conveying device and the difference between the first and second speed.

The above methods provide for ordering both a succession of randomly received products and an orderly (equally spaced) succession with missing products, but present the drawback of subjecting the products to frequent slippage in said given direction, both during transfer from the first to the second conveying device, and as the products travel along the conveying portions of the conveying devices. Which slippage obviously results in each product eventually slipping out of position, and the smaller the supporting surface of the product is in relation to its overall mass, the greater the position error is.

Such slippage mainly occurs at the transfer station when the product is positioned astride the first and second conveying device, and is therefore supported partly by the first and partly by the second conveying device normally traveling at different speeds. As a result, the product is subjected to differing amounts of thrust, which in turn results in slippage on the first or second or on both the conveying devices, and in either case in incorrect positioning of the product on the second conveying device.

SUMMARY OF THE INVENTION

It is an object of the present invention to provide a method of ordering and supplying products to a machine, designed to overcome the aforementioned drawbacks.

According to the present invention, there is provided a method for the orderly supply of randomly received products, the method comprising the steps of conveying a random succession of products by means of first conveying means traveling in a given direction at a first speed, and comprising a first conveying portion of variable length, an output of which is defined by a movable transfer station; conveying an orderly succession of products by means of second conveying means traveling in said direction at a second speed, and comprising a second conveying portion of variable length complementary to the length of the first conveying portion, the second conveying portion extending from said transfer station; and varying the position of the transfer station to vary the lengths of the first and second conveying portions inversely in relation to each other and as a function of the succession of products on the first conveying means and the difference between the first and second speed; the method being characterized by comprising the further steps of feeding the products from the first conveying means to the second conveying means via pocket type transfer means associated with the transfer station; and feeding the products, via said transfer means, into conveying pockets associated with the second conveying means and having a given equal spacing.

The present invention also relates to a device for the orderly supply of randomly received products.

According to the present invention, there is provided a device for the orderly supply of randomly received products to an unloading station, the device comprising first and second belt conveying means defining part of a path having a given total length and in turn comprising a first and a second portion of variable lengths equal to fractions of said total length, and between which is interposed a transfer station comprising a carriage connected to said first and second conveying means to define said first and second portions; and an adjusting device associated with the carriage, and for varying the lengths of said first and second portions; characterized in that at least said second conveying means comprise a succession of conveying pockets arranged with a given equal spacing; transfer means, operating between said first and second conveying means to transfer the products successively from said first conveying means to the conveying pockets of said second conveying means, being located on the carriage to define a portion of given length of said path and complementary to the first and second portions of variable lengths.

BRIEF DESCRIPTION OF THE DRAWINGS

A non-limiting embodiment of the present invention will be described by way of example with reference to the accompanying drawings, in which:

FIG. 1 shows a schematic partial side view, with parts in section and parts removed for clarity, of a preferred embodiment of the ordering device according to the present invention;

FIG. 2 shows a partial plan view, with parts removed for clarity, of the FIG. 1 device;

DETAILED DESCRIPTION OF THE INVENTION

Figure 3:
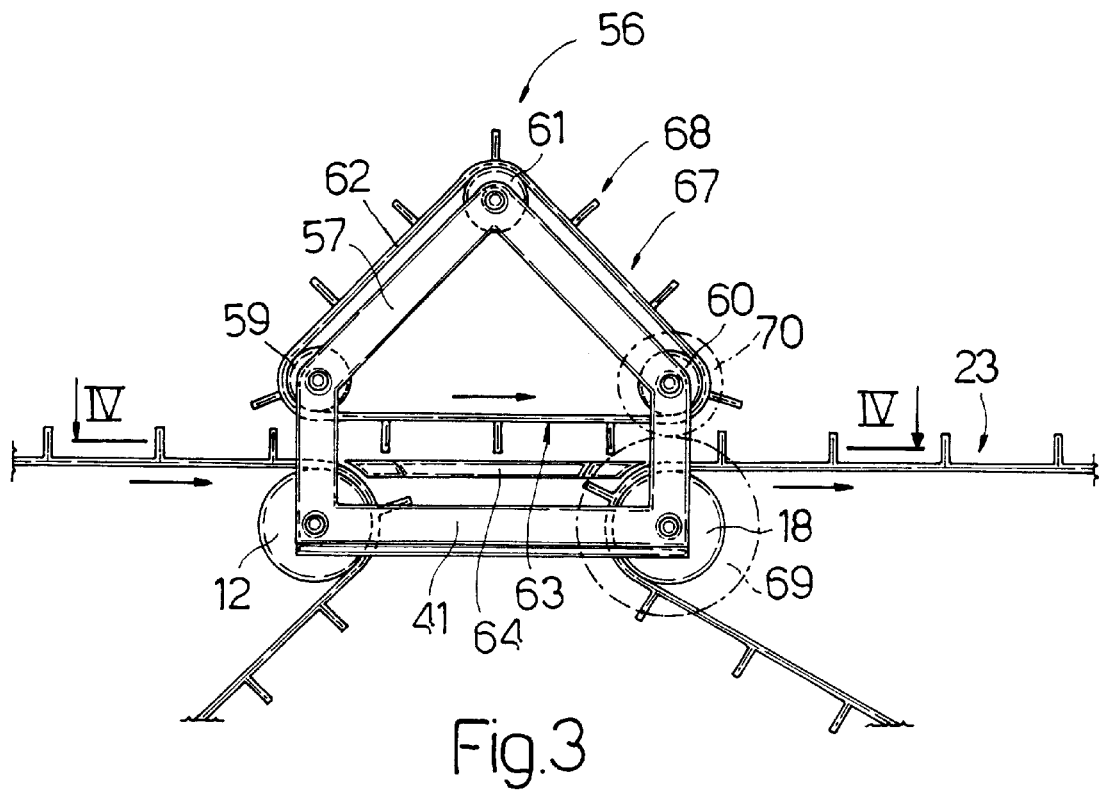
FIG. 3 shows a schematic partial side view of a first embodiment of a transfer device associated with the ordering device in FIGS. 1 and 2.

Number 1 in FIG. 1 indicates an ordering device for receiving a random succession 2 of products 3 from a dispensing device (not shown), and for supplying an orderly succession 4 of products 3, equally spaced with spacing P2, to a wrapping machine 5 in a substantially horizontal traveling direction 6.

Each product 3 in succession 2 is separated from each adjacent product by a distance D, which varies for each pair of adjacent products 3.

As shown in FIGS. 1 and 2, device 1 comprises two substantially horizontal belt conveyors 7 and 8 in series with each other, and for respectively receiving products 3 from said dispensing device (not shown), and supplying said orderly succession 4 to machine 5.

Conveyors 7 and 8 are defined by respective belts 9 and 10 looped about a number of pulleys indicated 11–15 for conveyor 7 and 16–20 for conveyor 8, and which rotate about respective axes parallel to one another and crosswise to direction 6. Pulleys 11, 12, 13, 14 of conveyor 7 and pulleys 16, 17, 18, 19 of conveyor 8 are fixed transmission pulleys; pulleys 15 and 20 are drive pulleys powered by respective motors M1 and M2 to drive respective conveyors 7 and 8 at respective speeds V1 and V2; and transmission pulleys 13 and 17 are fitted to movable shafts connected to respective tensioning devices 21 and 22 for imparting a given tension to belts 9 and 10.

Figure 4:
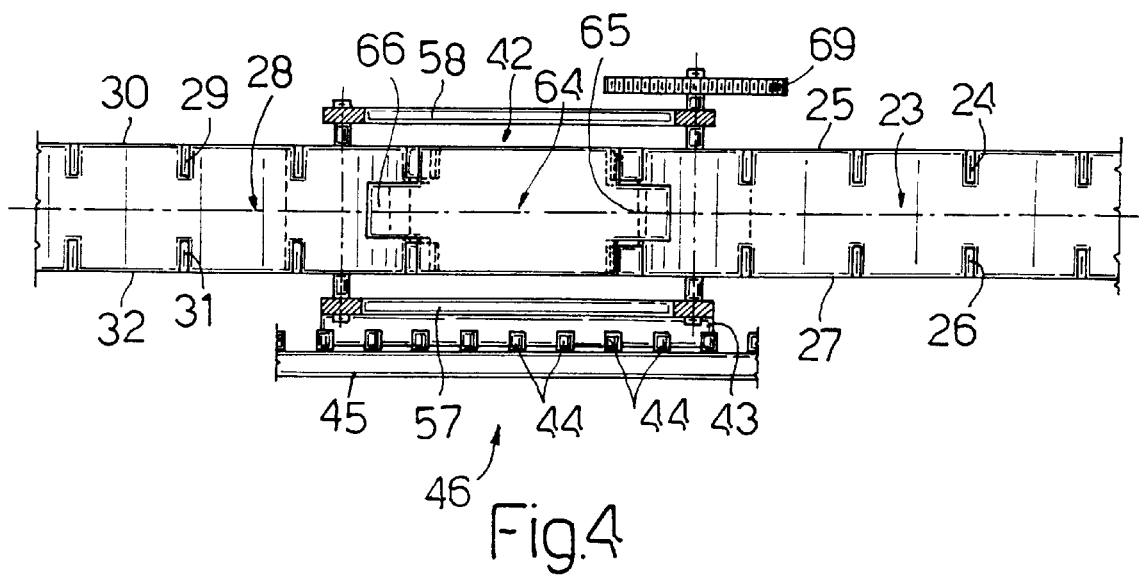
FIG. 4 shows a section along line IV—IV in FIG. 3.

Belt 10 comprises a succession of pockets 23, which, as shown more clearly in FIG. 4, are equally spaced with spacing P2, and are defined, on the outer surface of belt 10, by a succession of projections 24 equally spaced along one edge 25 of belt 10, and by a succession of corresponding projections 26 equally spaced along the other edge 27 of belt 10. More specifically, each projection 24 is aligned with a corresponding projection 26 in a direction perpendicular to direction 6, and defines, with projection 26, an axial passage of a given width D1.

In alternative embodiments (not shown), pockets 23 may be formed differently to retain products 3 of particular shapes, and may, for example, comprise retaining projections along edges 25 and 27 of belt 10. Moreover, pockets 23 are sized according to the size of product 3, so as to determine a definite position of product 3 or at least so confine displacement of product 3 as to ensure correct operation of wrapping machine 5.

Belt 9 of conveyor 7 has a flat outer surface, which, in an alternative solution shown in FIGS. 3 and 4, comprises a succession of pockets 28 for receiving respective products 3 and equally spaced along belt 9 with a spacing P1 not necessarily equal to spacing P2. Pockets 28 are defined by a succession of projections 29 arranged along one edge 30 of belt 9, and by a succession of corresponding projections 31 arranged along the other edge 32 of belt 9. More specifically, each projection 29 is aligned with a corresponding projection 31 in a direction perpendicular to direction 6, and defines, with projection 31, an axial passage of a width equal to said width D1.

In this case also, in alternative embodiments (not shown), pockets 28 may be formed differently to retain products 3 of particular shapes, and may, for example, comprise retaining projections along edges 30 and 32 of belt 9. Moreover, pockets 28 are sized according to the size of product 3, so as to determine a definite position of product 3 or at least confine displacement of product 3 inside pocket 28.

As shown in FIG. 1, pulleys 12 and 14 of conveyor 7 are end transmission pulleys, and define, on belt 9, a forward branch 33 and a return branch 34, the first of which comprises a conveying portion 35 extending between pulleys 11 and 12. Similarly, pulleys 16 and 18 of conveyor 8 are end transmission pulleys, and define, on belt 10, a forward branch 36 and a return branch 37, the first of which comprises a conveying portion 38 extending between pulleys 18 and 19. Conveying portions 35 and 38 define part of a path P along which products 3 are fed in direction 6, and the adjacent ends of conveying portions 35 and 38 define a transfer station T.

As shown in FIGS. 1 and 2, pulleys 12 and 18 form part of an adjusting device 39, which comprises a carriage 40 supporting pulleys 12 and 18. Carriage 40 comprises a plate 41 substantially parallel to the plane defined by the axes of pulleys 12 and 18, and having, as shown clearly in FIG. 4, a substantially rectangular central opening 42 crosswise to direction 6. Pulleys 12 and 18 are supported for rotation by plate 41 at opening 42, and define opening 42 through which belts 9 and 10 run. Carriage 40 also comprises a longitudinal rib 43 extending downwards from a longitudinal edge of plate 41 parallel to direction 6, and fitted with rollers 44 connected to a fixed guide 45 extending along a central portion 46 of path P.

Pulleys 14 and 16 define an adjusting device 47 comprising a carriage 48, in turn comprising a plate 49 substantially parallel to plate 41 and having a central opening 50. Pulleys 14 and 16 are supported for rotation by plate 49, and define opening 50.

Plates 41 and 49 connect two metal belt portions 51 and 52 to form a conveyor belt 53 looped about two pulleys 54 and 55 and forming a conveying device for adjusting device 39 along portion 46 of path P, and for adjusting device 47 along a similar path parallel to path P. Pulley 54 is a drive pulley powered by a motor M3; pulley 55 is a transmission pulley; and motor M3 drives carriage 40 by means of belt 53, and therefore determines the position and traveling speed of carriage 40.

Conveying portions 35 and 38 of the forward branches are supported on and, in use, slide along metal belt portions 51 and 52 respectively.

FIGS. 3 and 4 show a more detailed view of transfer station T and, more specifically, of carriage 40, which is connected to a transfer device 56 comprising two frames 57 and 58, which are integral with plate 41, lie in respective vertical planes on either side of belts 9 and 10, are parallel to each other, and support for rotation the opposite ends of the shafts of three pulleys 59, 60, 61, about which is looped a belt 62, a portion 63 of which, extending between pulleys 59 and 60, is substantially parallel to conveying portions 35 and 38 of belts 9 and 10.

The axes of pulleys 59, 60 and 61 are parallel to the axes of pulleys 12 and 18. More specifically, the axis of pulley 59 defines, with the axis of pulley 12, a plane perpendicular to the surface of belt 9, and the axis of pulley 60 defines, with the axis of pulley 18, a plane perpendicular to the surface of belt 10, so that the length of portion 63 equals the distance between the axes of pulleys 12 and 18, and extends substantially between the ends of conveying portions 35 and 38 adjacent to pulleys 12 and 18 respectively.

Plate 41 also supports a plate 64 extending between and connecting the adjacent ends of portions 35 and 38, and which, on the side facing belt 10, comprises a central appendix 65 tangent to belt 10 and extending across the passage defined by projections 24 and 26. Similarly, on the side facing belt 9, plate 64 comprises a central appendix 66 tangent to belt 9 and extending across the passage defined by projections 29 and 31, if first conveyor 7 is a pocket conveyor.

Belt 62 comprises a succession of pockets 67 equally spaced with the same spacing as spacing P2, of the same size as pockets 23, and defined by projections 68 located centrally on the outer surface of belt 62 and extending crosswise to direction 6. Projections 68 are shorter in length than the width D1 of the passage between pairs of projections 24,26 and 29,31, and provide for contacting and pushing products 3 successively along plate 64 in direction 6.

Transfer device 56 also comprises a gear 69 fitted to the shaft of pulley 18 and meshing with a gear 70 fitted to the shaft of pulley 60 of transfer device 56. The size ratio of gears 69 and 70 is the same as that of pulleys 18 and 60, so that belt 62 travels at the same speed as speed V2 of belt 10, and may be so adjusted as to keep pockets 67 in time with pockets 23 of belt 10.

As shown in FIG. 1, ordering device 1 comprises control means, in turn comprising a sensor S located over conveying portion 35 of forward branch 33 of conveyor 7, and preferably close to drive pulley 54. Sensor S detects the distribution of products 3 in succession 2, and supplies signals to a known control microprocessor C, which in turn transmits control signals to motors M1, M2 and M3, and determines the speed V1 of first conveyor 7, the speed V2 of second conveyor 8, and the speed V3 and location of carriage 40. In alternative embodiments (not shown) of the invention, motors M1, M2 and M3 may be continuous or step motors.

Microprocessor c constantly determines the location of carriage 40 by means of transducers (not shown), which may be encoders located on the shaft of transmission pulley 55, or linear transducers fitted to carriage 40 and for detecting references located, for example, along fixed guide 45. The location of carriage 40 may also be determined by an encoder normally fitted to motor M2, and a sensor (not shown) for detecting the passage of carriage 40 and supplying a signal to microprocessor C, which intervenes to correct any errors due to slippage between drive pulley 54 and belt 53, or any read errors of the encoder of motor M2.

Operation of ordering device 1 will now be described in detail with reference to different operating conditions. The speed V2 of conveyor 8 is generally assumed to be constant and adaptable to the normally constant frequency of wrapping machine 5.

In a first operating mode, any difference between spacing P2 and distance D between two adjacent products in succession 2 is compensated by moving carriage 40 right- or leftwards as required.

When the first of the two products 3 in question reaches station T, the position of carriage 40 is adjusted by microprocessor C according to the signals received from sensor S and so as to compensate the spacing error E $$E=D-P2$$

detected between the adjacent products 3 in succession 2. Carriage 40 is moved at an average speed V3 according to the equation:

$$V3=(D*V2-P2*V1)/E$$

for a time T equal to:

$$T=D/(V1-V3)$$

while maintaining speed V1 constant and other than V2.

In a second operating mode, spacing error E is compensated by adjusting speed V1 of first conveyor 7 so that its average value V1M over distance D equals:

$$V1M=D*V2/P2$$

The above operating modes for compensating error E may be used either separately or in combination with each other.

In the second of the above operating modes, if error E is relatively high, V1M also assumes a relatively high value; and, in the first of the above operating modes, the amount by which carriage 40 is shifted may prove critical with respect to the maneuvering capacity of adjusting device 39.

In both the above cases, it is therefore preferable and convenient to proceed according to a third operating mode combining the first two.

For example, in the event two products 3 in succession 2 are separated by a distance D greater than the predetermined spacing P2 on conveyor 8 after the first of the two products is transferred onto plate 64, conveyor 7 is so accelerated that distance D is traveled at speed V1 in time P2/V2. If distance D is much greater than P2, however, a very high average speed V1 involving rapid acceleration is required. To avoid this, carriage 40 is shifted rightwards at such a speed V3 as to allow more time in which to correct the spacing and, hence, a lower average speed equal to:

$$V1M=D*V2/P2-(D-P2)*i\ V3/P2$$

as opposed to:

$$V1M=D*V2/P2$$

To avoid excessively high adjustment quantities, therefore, microprocessor C calculates—on the basis of the detected values of distance D, the position of carriage 40, and instantaneous speeds V1 and V2—the average speed V1 and the acceleration A1 required to correct error E using the second operating mode, and compares this data with maximum permissible V1 and A1 values for ensuring reliable operation of ordering device 1. Microprocessor C also calculates the speed V3, travel time, and amount of travel of carriage 40 required to make the correction using the first operating mode, and compares this data with corresponding maximum permissible values. When one of the maximum permissible values is exceeded, microprocessor C, if it is operating in one error E correction mode, automatically switches to the combined third operating mode to adjust both speed V1 and the travel of carriage 40.

In other words, microprocessor C may be programmed to favor one or other of the above operating modes. For example, error E may selectively be corrected by first shifting carriage 40, and only using the combined operating mode in the event the travel of carriage 40 is unable to correct the error; or by varying speed V1; or by means of a combined speed adjustment and shift of carriage 40.

On being detected by sensor S, the position of product 3 is monitored according to the speed V1 of conveyor 7; the position of carriage 40 is also monitored instantaneously; and the appropriate spacing corrections are made as described above, to enable conveyor 7 to deposit product 3 onto plate 64 in time with the passage of a projection 68, which feeds product 3 along plate 64 into a pocket 23 on conveyor 8. Pockets 67 of transfer device 56 are already timed with respect to pockets 23 on conveyor 8 by virtue of the aforementioned ratio of gears 69 and 70.

If conveyor 7 comprises pockets 28, the need may arise to compensate for an empty pocket 28 caused, for example, by the product being rejected. In this case, the spacing correction is made in the same way as described previously, but, as described in detail later on, by timing the receiving pocket 67 with the pocket 28 on conveyor 7 as projections 68 on transfer device 57 are mated with projections 29 and 31 on first conveyor 7. In this case, transfer from pocket 28 on conveyor 7 to pocket 23 on conveyor 8 is made by projections 29 and 31 on conveyor 7 pushing product 3 onto plate 64, and by projection 68 simultaneously engaging and pushing the product along plate 64 into pocket 23 on conveyor 8.

Figure 5:
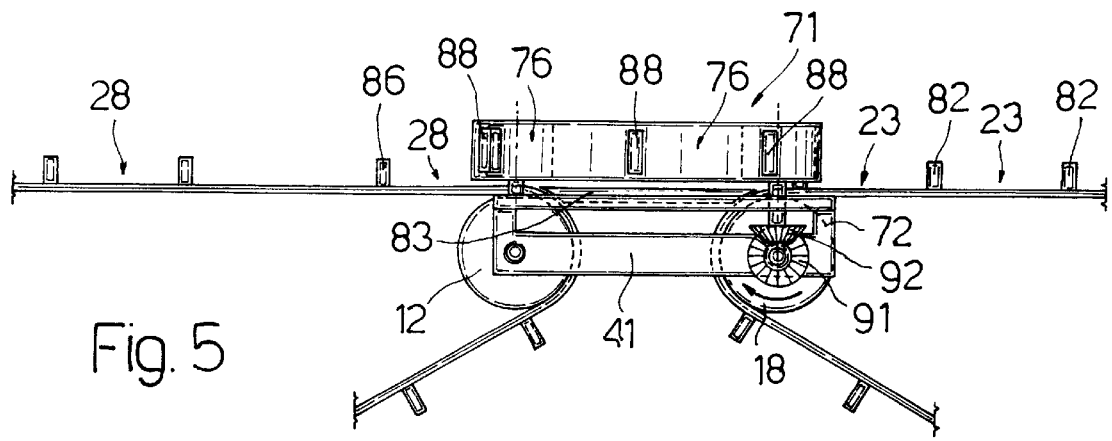
FIG. 5 shows a schematic partial side view of a second embodiment of a transfer device associated with the ordering device in FIGS. 1 and 2.
Figure 6:
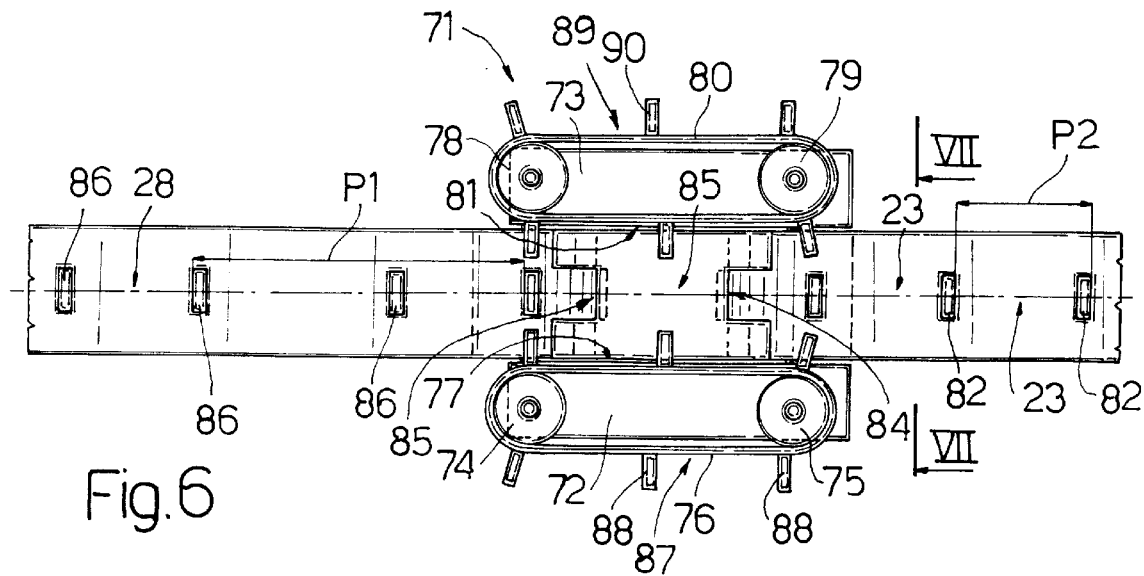
FIG. 6 shows a schematic partial plan view of the FIG. 5 device.
Figure 7:
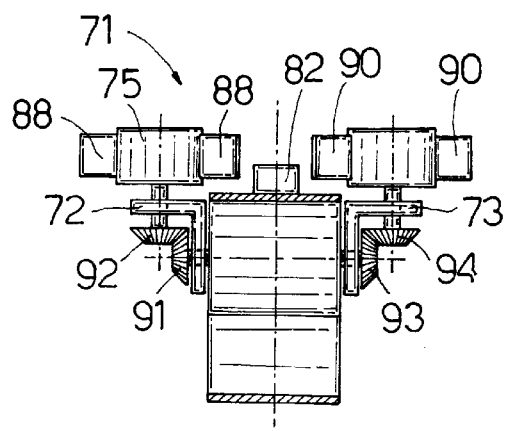
FIG. 7 shows a section along line VII—VII in FIG. 6.

By way of an alternative to device 56, FIGS. 5, 6 and 7 show a transfer device 71, which is connected to plate 41, and comprises two upside down L-shaped frames 72 and 73 located on either side of conveyors 7 and 8. Frame 72 supports for rotation two pulleys 74 and 75 having respective axes perpendicular to direction 6 and to the axes of pulleys 12 and 18, and which support an endless belt 76 comprising a straight portion 77 located perpendicularly, adjacent to branches 33 and 36 of belts 9 and 10, and parallel to path P.

Frame 73 supports for rotation two pulleys 78 and 79, in turn supporting an endless belt 80 comprising a straight portion 81 facing and parallel to straight portion 77. The axes of pulleys 74 and 78 lie in a plane perpendicular to the surface of belt 9 and extending through the axis of pulley 12, and the axes of pulleys 75 and 79 lie in a plane perpendicular to the surface of belt 10 and extending through the axis of pulley 18, so that straight portions 77 and 81 extend between the ends of conveying portions 35 and 38 close to pulleys 12 and 18.

If transfer device 71 is used, projections 24 and 26 in FIG. 4 are replaced by central projections 82, the opposite ends of which are located a given distance from edges 25 and 27; and plate 64 is replaced by a plate 83, which is fitted to plate 41 and has one end, tangent to conveyor 8, with a profile 84 complementary to the profile defined by projections 82 and by the outer surface of belt 10, and another end, tangent to conveyor 7, with a profile 85 complementary to the profile determined by projections 86 (if any) formed on belt 9 and similar to projections 82 on belt 10.

Belt 76 comprises a number of pockets 87 defined by projections 88, and belt 80 comprises a number of pockets 89 defined by projections 90. The corresponding pairs of projections 88 and 90 are equally spaced with the same spacing P2 as projections 82 on belt 10, travel in time with projections 82, and each contact and push the same product 3 along plate 83 in direction 6.

As shown in FIGS. 5 and 7, pulley 18 is coaxial and integral with a bevel gear 91 meshing with a bevel gear 92 coaxial and integral with pulley 75; and, on the opposite side to that connected to gear 91, pulley 18 is also coaxial and integral with a bevel gear 93 meshing with a bevel gear 94 coaxial and integral with pulley 79.

The ratio of gears 91, 92 and gears 93, 94 on either side of pulley 18 is equal to the size ratio of pulleys 18, 75 and 18, 79, so that the speed of belts 76 and 80 equals speed V2 of second conveyor 8.

Transfer device 71 operates in the same way as device 56, and therefore requires no further explanation.

Figure 8:
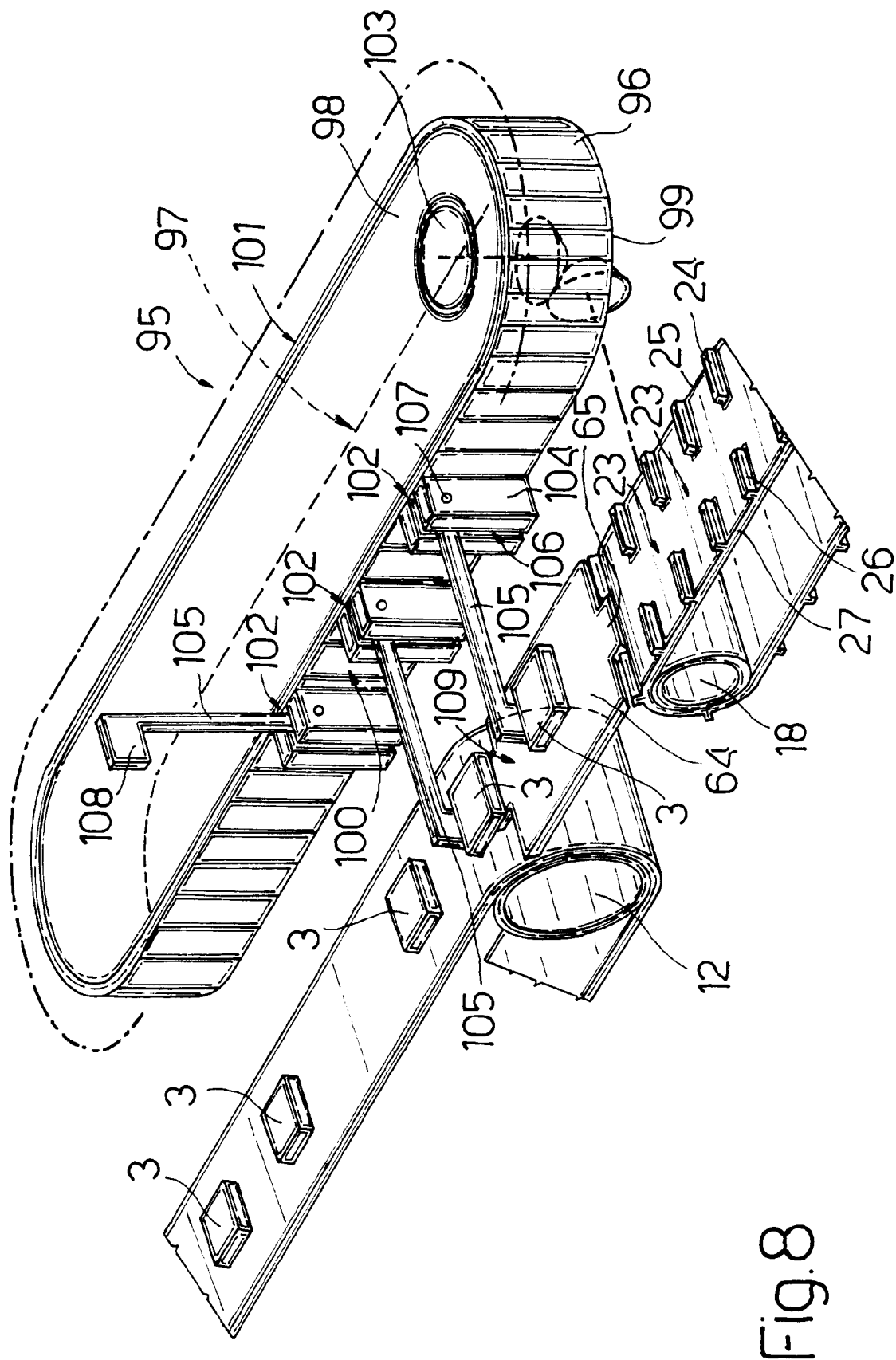
FIG. 8 shows a partial view in perspective, with parts removed for clarity, of a third embodiment of a transfer device associated with the ordering device in FIGS. 1 and 2.

FIG. 8 shows a transfer device 95 fittable to plate 41 in place of device 56 or 71, and comprising a belt 96 looped about a box 97, which is located at a higher level than the supporting surfaces of conveyors 7 and 8, and is defined by a horizontal, substantially rectangular top and bottom plate 98 and 99 with rounded ends. More specifically, the outer edges of plates 98 and 99 form slideways for the opposite edges of belt 96, which is supported on plates 98 and 99 in a vertical position perpendicular to the plane of branches 33 and 36 of conveyors 7 and 8.

Belt 96 comprises a work branch 100 and a return branch 101, which are parallel to each other and to path P, and are fitted with push units 102. Branch 100 extends substantially along the portion of path P between the ends of conveying portions 35 and 38, and push units 102 are equally spaced along belt 96 with the same spacing as spacing P2, and are fed forward at speed V2 by a vertical-axis pulley 103 fitted to plates 98 and 99 and rotated by a transmission connecting pulleys 18 and 103 and such as to ensure the speed of belt 96 equals speed V2 of belt 10.

Each push unit 102 comprises a base 104 integral with belt 96; and an arm 105, a first end of which is housed inside a vertical slot 106 in base 104 and is hinged to a horizontal pin 107 extending through slot 106, and a second end of which is defined by a blade 108.

By means of known adjustable actuating means (not shown), arm 105 is rotated about pin 107 between a raised idle position assumed by arm 105 as it travels along branch 101, and a lowered operating position assumed by arm 105 as it travels along branch 100, and wherein arm 105 is positioned substantially horizontally, and blade 108 travels over plate 64 to define a conveying pocket 109 with each adjacent blade 108, and to transfer a respective product 3 from conveyor 7 to conveyor 8.

Device 95 operates in the same way as devices 56 and 71, and therefore requires no further explanation.

It should be emphasized, however, that, in the case of device 95, it is possible to control the instant in which each arm 105 is rotated into the operating position, and so select, for each product 3, the most suitable instant in which to commence transfer from conveyor 7 to conveyor 8.

I claim:

1. A method for the orderly supply of randomly received products (3), the method comprising the steps of conveying a random succession (2) of products (3) by means of first conveying means (7) traveling in a given direction (6) at a first speed (V1), and comprising a first conveying portion (35) of variable length, an output of which is defined by a movable transfer station (T); conveying an orderly succession (4) of products (3) by means of second conveying means (8) traveling in said direction (6) at a second speed (V2), and comprising a second conveying portion (38) of variable length complementary to the length of the first conveying portion (35), the second conveying portion (38) extending from said transfer station (T); and varying the position of the transfer station (T) to vary the lengths of the first and second conveying portions (35, 38) inversely in relation to each other and as a function of the succession (2) of products (3) on the first conveying means (7) and the difference between the first (V1) and second (V2) speed; the method being characterized by comprising the further steps of feeding the products (3) from the first conveying means (7) to the second conveying means (8) via pocket type transfer means (56; 71; 95) associated with the transfer station (T); and feeding the products (3), via said transfer means (56; 71; 95), into conveying pockets (23) associated with the second conveying means (8) and having a given equal spacing (P2).

2. A method as claimed in claim 1, characterized in that the products (3) are fed by said transfer means (56; 71; 95) towards said conveying pockets (23) along a plate (64; 83) connecting the conveying portion (35) of the first conveying means (7) to the conveying portion (38) of the second conveying means (8).

3. A method as claimed in claim 1, characterized in that said first speed (V1) is varied as a function of the distance between adjacent products (3) in said random succession (2) of products (3).

4. A method as claimed in claim 3, characterized in that said first speed (V1) is varied as a function of the lengths of said first and second conveying portions (35, 38).

5. A method as claimed in claim 2, characterized in that the products (3) are transferred from conveying pockets (28) on the first conveying means (7) onto said plate (64; 83), and are simultaneously fed to the second conveying means (8) by push means (68; 88,90; 108) associated with the transfer means (56; 71; 95).

6. A method as claimed in claim 2, characterized in that the push means (68; 88,90; 108) are fed in said direction (6) at a speed equal to said second speed (V2) of the second conveying means (8).

7. An ordering device (1) for supplying an orderly succession (4) of randomly received products to an unloading station (5), the device (1) comprising first and second belt conveying means (7, 8) defining part of a path (P) having a given total length and in turn comprising a first and a second portion (35, 38) of variable lengths equal to fractions of said total length, and between which is interposed a transfer station (T) comprising a carriage (40) connected to said first and second conveying means (7, 8) to define said first and second portions (35, 38); and an adjusting device (39) associated with the carriage (40), and for varying the lengths of said first and second portions (35, 38); characterized in that at least said second conveying means (8) comprise a succession of conveying pockets (23) arranged with a given equal spacing (P2); transfer means (56; 71; 95), operating between said first and second conveying means (7, 8) to transfer the products (3) successively from said first conveying means (7) to the conveying pockets (23) of said second conveying means (8), being located on the carriage (40) to define a portion of given length of said path (P) and complementary to the first and second portions (35, 38) of variable lengths.

8. A device as claimed in claim 7, characterized in that the first conveying means (7) comprise conveying pockets (28) with a given spacing (P1).

9. A device as claimed in claim 7, characterized in that the conveying pockets (23) are defined by projections (24,26; 82) extending on the surface of a conveyor belt (10) of the second conveying means (8); and the conveying pockets (28) are defined by projections (29,31; 86) extending on the surface of a conveyor belt (9) of the first conveying means (7).

10. A device as claimed in claim 7, characterized in that the transfer means (56; 71; 95) comprise a plate (64; 83), and at least one transfer belt (62; 76,80; 96) associated with push means (68; 88,90; 108).

11. A device as claimed in claim 10, characterized in that said transfer belt (62; 76,80) is a belt conveyor comprising pockets (67; 87,89) defined by projections (68; 88,90) and having the same spacing (P2) as the conveying pockets (23) of the second conveying means (8).

12. A device as claimed in claim 11, characterized in that said projections (68; 88,90) define said push means (68; 88,90), and extend perpendicularly to the surface of said transfer belt (62; 76, 80) and crosswise to said path (P).

13. A device as claimed in claim 11, characterized in that said transfer belt (62) comprises a belt portion (63) substantially parallel to the surfaces of the first and second conveying portions (35, 38) of said conveyor belts (9, 10), and extending between the ends of said first and second conveying portions (35, 38).

14. A device as claimed in claim 11, characterized in that said transfer means (71) comprise two transfer belts (76, 80), each of which comprises a straight belt portion (77, 81) perpendicular to the surfaces of the first and second conveying portions (35, 38) and extending between said first and second conveying portions (35, 38) and parallel to said path (P).

15. A device as claimed in claim 10, characterized in that said transfer means (95) comprise one transfer belt (96) fitted with arms (105), which are rotated between an idle position and an operating position by electromechanical actuating means.

16. A device as claimed in claim 15, characterized in that each of said arms (105) is fitted on the end with a blade (108) defining a push means (108).

* * * * *